United States Patent [19]

Styring, Jr.

[11] 4,351,655

[45] Sep. 28, 1982

[54] TWO STAGE CARBON DIOXIDE AND METHANE SEPARATION

[75] Inventor: Ralph E. Styring, Jr., Dallas, Tex.

[73] Assignee: Atlantic Richfield Company, Los Angeles, Calif.

[21] Appl. No.: 256,197

[22] Filed: Apr. 21, 1981

Related U.S. Application Data

[63] Continuation-in-part of Ser. No. 108,204, Dec. 28, 1979, abandoned.

[51] Int. Cl.³ .............................................. F25J 3/02
[52] U.S. Cl. .......................................... 62/28; 62/24
[58] Field of Search ............................. 62/17, 24–28

[56] References Cited

U.S. PATENT DOCUMENTS

| | | | |
|---|---|---|---|
| 3,595,782 | 7/1971 | Bucklin et al. | 62/28 |
| 3,983,711 | 10/1976 | Solomon | 62/28 |
| 4,012,212 | 3/1977 | Kniel | 62/17 |
| 4,277,268 | 7/1981 | Spangler, Jr. | 62/26 |
| 4,284,423 | 8/1981 | Eakman | 62/26 |

*Primary Examiner*—Norman Yudkoff
*Attorney, Agent, or Firm*—M. David Folzenlogen

[57] ABSTRACT

A method is disclosed for standard distillation of a mixture of carbon dioxide and ethane derived from a prior separation state in a way that greater than normal separation is obtained. The greater separation is accomplished in two stages. In the first stage, an azeotrope of carbon dioxide and ethane is formed in a first distillation column at a first pressure. The azeotropic mixture is then transferred to a second distillation column operated at a second pressure. The second pressure is at least 150 psia greater or less than the first pressure and is sufficient to shift the phase curves or equilibrium ratios so that additional separation of the ethane and carbon dioxide is accomplished in the second column. Preferably, if the concentration of carbon dioxide in the original ethane-carbon dioxide mixture is less than the concentration of carbon dioxide in the azeotrope, the pressure in the second column will be lower than pressure in the first column. The reverse is preferred when the concentration of carbon dioxide in the original mixture is greater than the concentration of carbon dioxide in the azeotrope. The method is useful in carbon dioxide separation facilities where it is desirable to recover additional ethane that would otherwise be lost.

3 Claims, 2 Drawing Figures

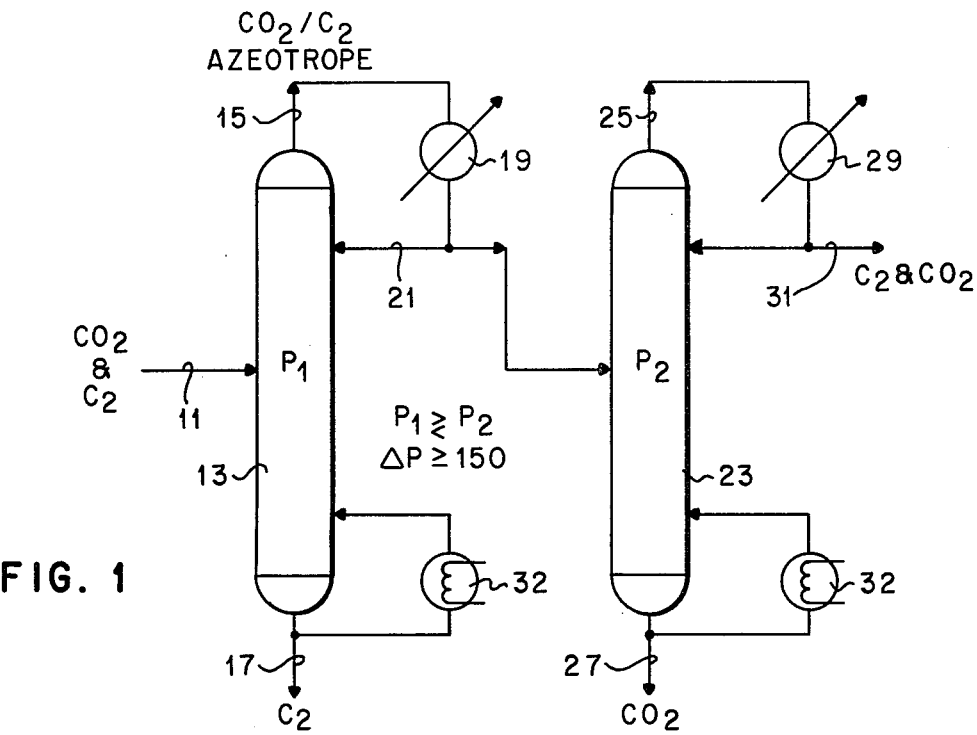
FIG. 1
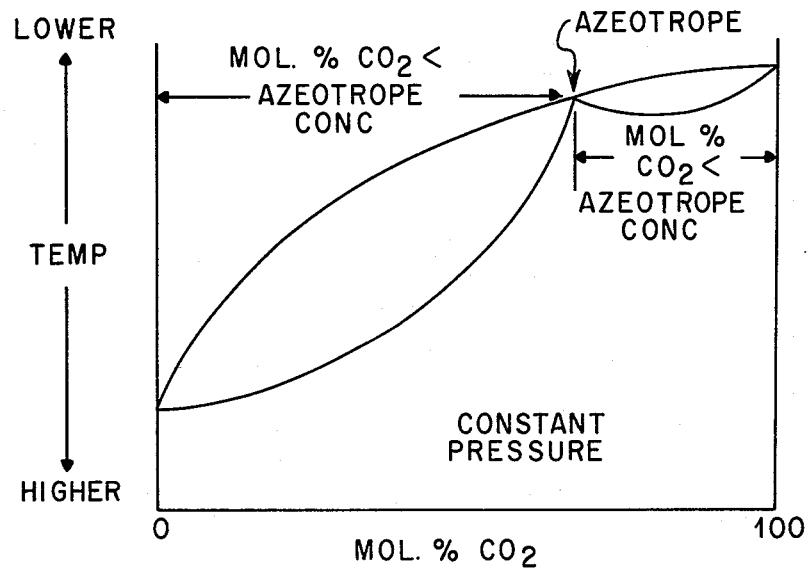
FIG. 2 ILLUSTRATION OF AZEOTROPE MAXIMUM BOILING CURVES PHASE DIAGRAMS

TWO STAGE CARBON DIOXIDE AND METHANE SEPARATION

CROSS REFERENCE TO RELATED APPLICATIONS

This application is a continuation-in-part of copending application Ser. No. 108,204, filed Dec. 28, 1979, by the same Applicant and owned by a common assignee, now abandoned.

BACKGROUND OF THE INVENTION

This invention is concerned with improving the separation of a mixture of carbon dioxide and ethane by distillation. More particularly, the invention pertains to a two stage distillation method where a carbon dioxide-ethane azeotrope is formed at one pressure and the azeotropic mixture is distilled at a significantly different pressure.

It is sometimes desirable to separate carbon dioxide from a gaseous mixture containing ethane, for example, in the treatment of natural gas or a reservoir injection gas, or in the preparation of synthetic natural gas. In one or more stages of these processes, carbon dioxide, ethane and heavier hydrocarbons are separated or recovered as a mixture. It is then desirable to separate the carbon dioxide from the remaining hydrocarbons, sometimes called NGL (natural gas liquids). When carbon dioxide is distilled or fractionated from the hydrocarbons, an azeotrope of carbon dioxide and ethane is formed at an overhead point in the distillation column. At this point no more ethane is separated from the carbon dioxide. Generally, unless it is desirable to recover the carbon dioxide, the carbon dioxide is vented unless the concentration of ethane in the azeotrope is such that environmental regulations make it necessary to burn the ethane-carbon dioxide mixture. Flaring is frequently an expensive and difficult process, especially in areas where the amount and concentration of that gas being flared randomly varies with various operating or producing conditions. In processes where it is desirable to recover the carbon dioxide, for example, tertiary recovery processes, the unseparated ethane is lost.

The ethane in the carbon dioxide is a valuable hydrocarbon. This invention is concerned with separating and recovering ethane along with the other hydrocarbons that might be in a carbon dioxide-ethane mixture derived from a prior process.

SUMMARY OF THE INVENTION

A mixture of carbon dioxide and ethane derived from a prior separation stage or recovery process is separated in two distillation columns operated in a particular fashion. This is accomplished by first distillation of a carbon dioxide-ethane mixture to form an ethane-carbon dioxide azeotrope at a first pressure. The azeotropic mixture is then transferred to a second distillation column operated at a different pressure. The pressure difference between the two columns is at least 150 psia and is sufficient to allow further distillation of the azeotrope so that additional separation is obtained. The relative concentrations of carbon dioxide and ethane in an azeotropic mixture depend on the pressure at which the azeotrope was formed. Increasing the distillation pressure causes the azeotrope point to move toward the right side of a phase diagram. Decreasing the distillation pressure causes the azeotrope point to move to the left. When the concentration of carbon dioxide in the original ethane-carbon dioxide mixture is less than the concentration of carbon dioxide in the azeotropic mixture formed in the first distillation column, preferably the pressure in the second stage distillation column will be at least 150 psi less than the pressure in the first stage distillation column. A change in pressure of at least 150 psi causes the relative concentration of the azeotropic mixture to be such that the mixture falls to the other side of the new azeotrope point for the second pressure because decreasing the pressure moves the azeotropic point toward the left side of the phase diagram. Vice versa, when the concentration of carbon dioxide in the original mixture is greater than the concentration of carbon dioxide in the azeotropic mixture formed in the first distillation column, the pressure in the second stage distillation column preferably will be at least 150 psi greater than the pressure in the first stage distillation column. This shifts the azeotropic point toward the right side and allows additional separation.

BRIEF DESCRIPTION OF THE DRAWING

FIG. 1 is a schematic representation of two distillation stages for separating a mixture of carbon dioxide and ethane.

FIG. 2 is a typical bubble point diagram depicting the formation of a $CO_2$-ethane azeotrope.

DETAILED DESCRIPTION

In the processing of gases containing carbon dioxide and ethane, for example, natural gas, there are times when it is necessary to remove carbon dioxide. For example, natural gas in predominantly methane. The methane is frequently mixed with carbon dioxide, ethane and other heavier hydrocarbons. This disclosure pertains to separating ethane and carbon dioxide after the methane has been separated thereby leaving a mixture of carbon dioxide, ethane and other hydrocarbons is processed to separate the carbon dioxide. This disclosure relies on the fact that after the methane is removed, some of the ethane will follow the carbon dioxide stream because ethane and carbon dioxide form an azeotrope. An azeotrope is not formed in the presence of gases which are more volatile than ethane and carbon dioxide, for example, methane. The composition of the ethane-carbon dioxide azeotrope depends on the operating conditions of the fractionation column which are generally fixed by the pressure. Conventionally, the distillation of a mixture of carbon dioxide and ethane will result in a carbon dioxide purity of only sixty-five to seventy-five mole percent. This ethane concentration is unacceptably high for venting the carbon dioxide. Moreover, if the volumn of carbon dioxide is sufficiently large, the ethane is worth recovering.

Accordingly, in FIG. 1, a mixture of carbon dioxide and ethane, with or without heavier hydrocarbons, is passed through feed inlet line 11 into first stage distillation column 13 at a point which is between overhead effluent line 15 and bottoms liquid line 17. This mixture of carbon dioxide and ethane has been derived from a prior carbon dioxide separation stage or recovery process. For purposes of this disclosure, the previous stage or process is considered a carbon dioxide separation stage or recovery process if any fluid stream containing carbon dioxide and ethane and not containing methane and more volatile substances is separated or developed. For example, the prior stage may have been a methane separation stage wherein a stream of carbon dioxide and ethane with or without heavier hydrocarbons is developed. The mixture may be gaseous, liquid, or a mixture of gas and liquid phases. Usually the mixture will be a two phase mixture at an elevated pressure. The pressure of the mixture will be at or above the pressure of the distillation column. The operation of distillation columns is well known and will not be discussed in detail.

Distillation column 13 is operated in a way that an azeotrope of carbon dioxide and ethane will be formed at a first pressure in the upper section of the rectification section of the column. This azeotrope exits the column through overhead effluent line 15. The concentration of carbon dioxide and ethane in the azeotrope will depend on the column overhead operating conditions. As shown, the carbon dioxide-ethane azeotrope overhead effluent fluids are cooled in first condenser 19. The condenser will be operated at a temperature above minus 69.9° F., the triple point of carbon dioxide, to prevent the formation of solid carbon dioxide. Some of the cooled overhead azeotrope will usually be recycled to column 13 through reflux inlet line 21.

The ethane and heavier hydrocarbons in the feed mixture which are liquefied in distillation column 13 are removed through bottoms liquid line 17 and recovered.

The azeotrope from first distillation column 13 is then transferred to second distillation column 23 which is operated at a second pressure. There must be at least 150 psia difference between the second pressure in second column 23 and the first pressure in first column 13. The pressure differential will usually be greater than 150 psia, but it will not be less than this. In second distillation column 13, in the usual fashion, some of the ethane and carbon dioxide are separated. For illustrative purposes, a new ethane-carbon dioxide azeotrope is shown as leaving column 23 through overhead line 25 and the carbon dioxide enriched stream through bottoms line 27. In a typical fashion, the overhead fluids in line 25 are cooled in condenser 29 and some of the cooled overhead fluids in recovery-reflux line 31 are returned to the column and the remaining mixture may be recycled to first distillation column 13 or to a third distillation column operated at different pressure.

Both distillation columns will have the usual side heaters or reboilers represented by reboilers 32. These reboilers and overhead condensers 19 and 29 are used to balance the heat loads of the columns.

For purposes of this disclosure, the first pressure may be either greater than or less than the second pressure. In a two stage system, it is preferred to operate first column 13 at a higher pressure than second column 23 as this avoids added compression costs and the concentration of carbon dioxide in the original mixture of ethane and carbon dioxide is less than the concentration of carbon dioxide in the azeotrope. The flow of the two effluent fluids in the second column could be reversed depending on the conditions selected. The fluid with the highest equilibrium constant of K value is normally separated overhead.

The bases for first forming an azeotropic mixture and then distilling the azeotrope at a significantly different pressure and a preferred set of operating conditions for the two fractionating columns may be understood by reference to FIG. 2 and to the following Table I.

TABLE I

| Temp. °F. | Pres. psia | Mol. % $CO_2$ at Less than Azeotrope Composition | | | Mol. % $CO_2$ at Greater than Azeotrope Composition | | |
|---|---|---|---|---|---|---|---|
| | | K $CO_2$ | K $C_2$ | $\alpha\left(\dfrac{CO_2}{C_2}\right)$ | K $CO_2$ | K $C_2$ | $\alpha\left(\dfrac{CO_2}{C_2}\right)$ |
| 20 | 460 | 1.20 | 0.84 | 1.43 | 0.978 | 1.18 | 0.829 |
| 0 | 340 | 1.30 | 0.80 | 1.63 | 0.966 | 1.27 | 0.761 |
| −40 | 180 | 1.29 | 0.78 | 1.65 | 0.88 | 1.55 | 0.567 |

FIG. 2 is a typical liquid-vapor equilibrium phase diagram for the ethane and carbon dioxide plotted at constant pressure with temperature on the y-axis and carbon dioxide concentration on the x-axis. One-half is labeled "Mol. % $CO_2$ is less than Azeotrope Composition". This is the left side of the diagram. A similar heading is used in Table I for this side of the azeotrope. The temperature is higher on the left side of the azeotrope. In the distillation art, this is called the higher pressure side of the azeotrope because columns are run at constant pressure and the higher the pressure, the higher the temperature for a given set of fluid components.

The other half of Table I and FIG. 2 is labeled "Mol. % $CO_2$ at greater than Azeotrope Composition". This is the right side of the diagram beyond the azeotropic point. It is called the lower pressure side because it is at a lower temperature than the other side.

In Table I, the equilibrium constant K is the ratio of the mole percent of the component in the gas phase over the mole percent of the component in the liquid phase. On the left side of the diagram where the mole percent of the $CO_2$ is less than the azeotrope composition, the K value is greater than 1 and approaches 1 as the azeotrope is approached. On the other side of the azeotrope, the K value is less than one because the concentrations flip-flop. This is why an azeotrope is a pinch point in a distillation column, that is, a point where it would take an infinite number of trays to separate the components. Columns are usually not designed to approach the azeotropic point because the amount of separation obtained does not justify the added costs of the system. But in this process of the disclosure, the azeotropic point is approached so that at pressure changes of 150 psia and more additional separation may be obtained.

This is better illustrated by considering alpha values. Alpha is the ratio of the K values. When alpha is not 1, the components may be separated. If alpha is greater than one, the component in the numerator of the ratio, i.e., carbon dioxide, comes off overhead. When the alpha value is less than one, the component in the denominator, i.e., ethane, comes off overhead in normal operation.

The ethane-carbon dioxide azeotrope is not very pressure sensitive. In Table I, at the pressure which provides a 20° F. operating temperature the azeotrope is about 70% carbon dioxide and at −20° F. is about 65% carbon dioxide. In other words, decreasing the pressure moves the azeotropic point toward the left side of the phase diagram and increasing the pressure shifts the azeotropic point toward the right side of the phase diagram.

In the process of the disclosure it is preferred that the azeotropic point be shifted toward the side from which the azeotrope was approached. In other words, if the original mixture in line 11 to first column 13 contains less carbon dioxide than the azeotropic concentration, the azeotropic point will be approached from the left and it is preferred to shift the azeotropic point toward the left by decreasing the operating pressure of second distillation column 23. This is illustrated in the left side of Table I when the carbon dioxide has a higher K value than ethane and the alpha values are greater than one. At a preferred operating temperature of 0° F. and 340 psia for column 13, an azeotrope containing about 68% carbon dioxide. In column 23, the pressure is 160 psia less than in column 13 and the operating temperature is −40° F. This would form an azeotrope containing about 65% carbon dioxide. In other words, the azeotropic point is shifted to the left. Since the original mixture was approaching the azeotrope from the left side and since the first column was operated to come close to the azeotropic point, a shift of 3% moves the azeotropic point to the left side of the 68% concentration in the azeotropic mixture and further separation may be accomplished.

If the original fluid has a carbon dioxide concentration greater than the azeotrope, the reverse would apply and preferably the pressure in second column 23 would be greater than the pressure in first column 13.

A set of three temperatures and pressures are given in Table I to illustate that on one side of the azeotrope, the higher pressure side, the carbon dioxide has a higher K value than the ethane. On the other or lower pressure side, the situation is reversed and the ethane has the higher K value. In the separation method of this invention, preferably the first column is operated at a pressure corresponding to one side of the azeotropic ratio and the azeotrope is treated in a second column at a pressure on the other side. In this way additional ethane is separated from the carbon dioxide, or vice versa. The separation will, of course, not be complete. Since the carbon dioxide azeotrope is not highly pressure sensitive, it is important that the shift be significant otherwise the additional separation would be marginal at best. In all cases, therefore, the pressure difference between the two columns must be at least 150 psia. It will usually be greater.

Reasonable variations and modifications are possible within the scope of this disclosure without departing from the spirit and scope of this invention.

The embodiments of the invention in which an exclusive property or privilege is claimed are defined as follows:

1. A method for separating a mixture of carbon dioxide and ethane derived from a prior separation stage, said method comprising:
   (a) passing a fluid mixture comprised of carbon dioxide and ethane into a first distillation column, said fluid mixture having been derived from a prior carbon dioxide separation stage;
   (b) operating said first distillation column at a first pressure to form an azeotropic mixture of carbon dioxide and ethane;
   (c) passing said azeotropic mixture to a second distillation column;
   (d) operating said second distillation column at a second pressure different from said first pressure, said difference between said first pressure and said second pressure being at least 150 psia; and
   (e) separating and recovering at least a portion of said ethane in said azeotropic mixture passed to said second distillation column.

2. In the method of claim 1 wherein said first pressure of said first distillation column is greater than said second pressure of said second distillation column.

3. In the method of claim 1 wherein said second pressure of said second distillation column is greater than said first pressure of said first distillation column.

* * * * *